UNITED STATES PATENT OFFICE.

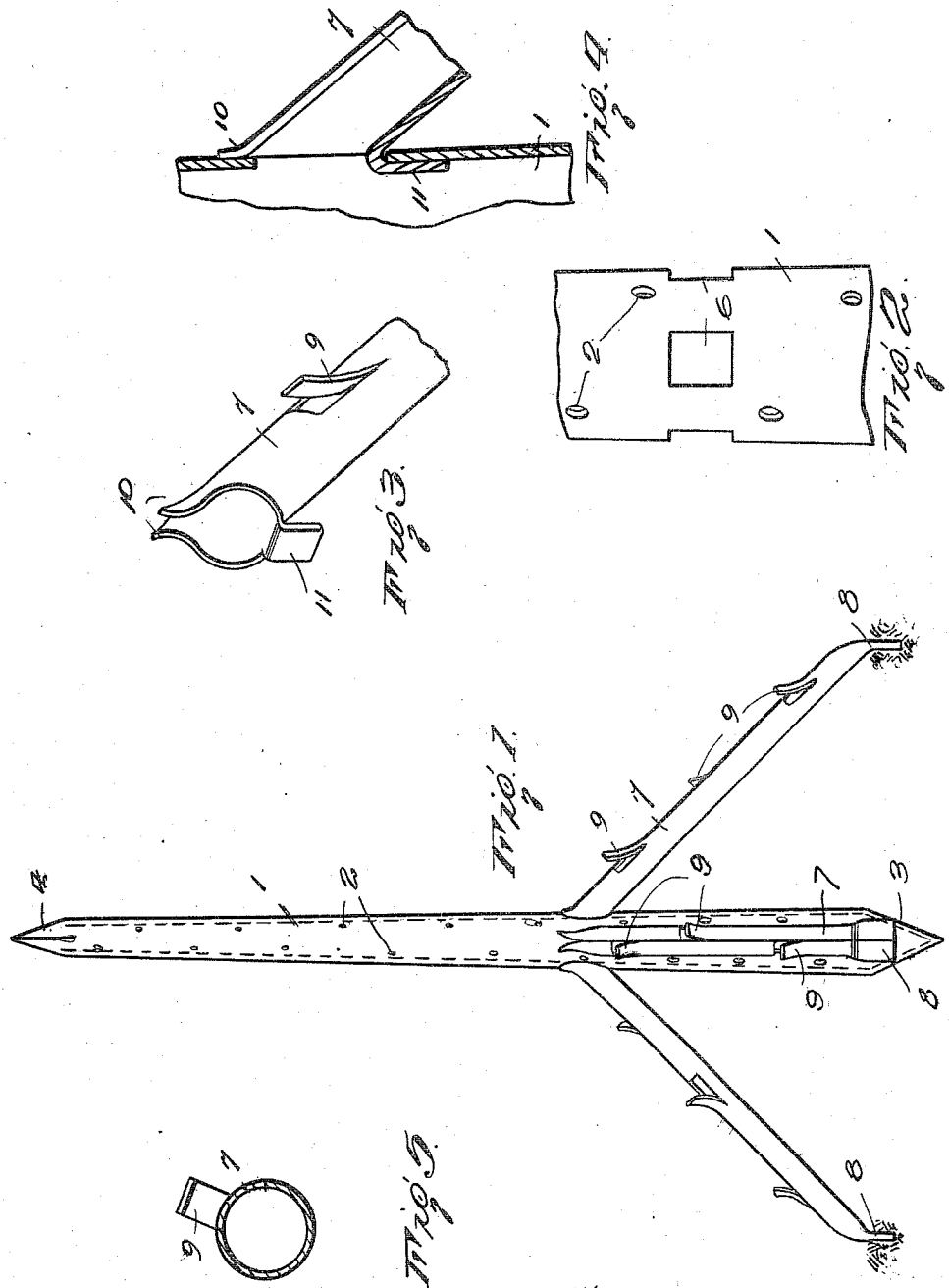

WILKINS H. MAYBERRY, OF KENNETT, MISSOURI.

HAY STACKING AND CURING DEVICE.

1,305,823. Specification of Letters Patent. Patented June 3, 1919.

Application filed May 14, 1918. Serial No. 234,414.

*To all whom it may concern:*

Be it known that I, WILKINS H. MAYBERRY, a citizen of the United States, residing at Kennett, in the county of Dunklin and State of Missouri, have invented certain new and useful Improvements in Hay Stacking and Curing Devices, of which the following is a specification.

This invention relates to improvements in hay stacking and curing devices, and it is the principal object of the invention to provide a device for facilitating the stacking of hay in open subsequent to the mowing of the same and effectually ventilating it during the usual sun drying process common in the art, thus insuring the removal of all foul and impure air and preserving the hay in a wholesome state until removed for baling or storing.

Another object of the invention is to provide a device of the character mentioned which is of such construction as will prevent the hay arranged thereabout from having undue movement, thus insuring a perfect and compact stack or form.

Other objects will be in part obvious and in part pointed out hereinafter.

The invention consists, furthermore, in the novel arrangement and combination of the parts of the device, as well as in the details of the construction of the same, all of which will be more fully described in the following specification, and then finally embodied in the clauses of the claim, which are appended to the specification and which form an essential part thereof.

In the drawings:

Figure 1 is a side elevation of the improved device in set up position.

Fig. 2 is a fragmentary side elevation of the pole or upright employed.

Fig. 3 is a fragmentary detail in perspective of one of the bracing elements.

Fig. 4 is a fragmentary detail in section through a portion of the pole and one of the bracing elements, and Fig. 5 is a transverse section through one of said bracing elements.

Having more particular reference to the drawings, in connection with which like reference characters will designate corresponding parts throughout the several views, my improved hay stacking and curing device includes a tubular upright or pole indicated by the numeral 1, the same being tapered throughout its length and having a plurality of perforations 2 therein, while the lower portion thereof is pointed as at 3 to facilitate the embedding of the same in a field or other surface, and the top or upper end thereof is substantially closed and tapered by splitting a portion of the same longitudinally and bending it inwardly as indicated by the numeral 4. A series of circumferentially disposed openings 6 are formed in the intermediate portion of the pole or upright 1 and serve as means for facilitating connection between the upper ends of tubular bracing elements 7, said elements having their lower ends closed by flattening the same and offsetting them to form substantial anchoring feet 8 in order that they can be readily engaged or embedded in the field or surface receiving said pole. Barbs or tongues 9 are struck outwardly from various portions of the tubular bracing elements 7 throughout their lengths to cause adhesion of the hay thereto, or other matter arranged thereabout, and also to permit perfect ventilation of such matter. Those ends of the tubular bracing members 7 arranged adjacent the intermediate portion of the pole 1 are split and provided with oppositely disposed ears 10, while an angularly disposed tongue 11 is formed on the opposite marginal portion thereof. Thus, these ends of the tubular bracing elements 7 can be effectually engaged with the intermediate portion of the pole 1 by inserting the same in the circumferentially arranged openings 6, the tongues 11 engaging over the lower marginal portions of said openings while the oppositely disposed ears 10 have bearing upon the adjacent outer portions of said pole. In this way, it is to be noted that slight relative movement or adjustment of the tubular elements with relation to the upright 1 will be permitted and as a consequence, the same will be allowed to automatically adjust themselves during the settling of the hay or other matter subsequent to the arranging or stacking of the same thereabout.

When using my improved hay stacking and curing device, the pole or upright 1 is engaged or embedded in the earth of a field whereupon the upper ends of the tubular bracing elements 7 are engaged therewith in the manner heretofore outlined. The lower offset flattened ends 8 of the tubular bracing elements are then embedded in the adjacent portions of the earth and as will be appreciated, form means for maintaining the pole or upright in a true vertical position. Hay is now placed upon the braces 7 about the lower portion of the pole 1, the first of the same being engaged with the barbs 9 and consequently held firmly in position. The remaining hay is so piled as to "tie on" the hay arranged therebelow and hence when the same is stacked up near top of the pole it will be in compact form and, therefore, prevented from having undue movement. Finally, the stack so formed is "capped" in the usual manner by placing a quantity of hay over the pointed top 4 of the pole 1. Obviously, the perforations in the pole or upright 1 and in the tubular bracing elements 7 serve to permit free ventilation thereof, hence, all moisture which tends to move toward the center of the stack will be removed therefrom during the usual sun curing process. By reason of the peculiar manner in which the tubular bracing elements 7 are engaged with the intermediate portion of the pole or upright 1, it is to be noted that slight relative movement of the same will be permitted, such as may be necessary upon the settling or packing of the hay subsequent to the piling or stacking of the same about the device, without liability of the disalining of the openings 6 at the passageways formed by reason of the tubular bracing elements 7. With the hay so stacked about my improved device, the strength will be permitted to remain therein while the color remains a bright green, and also allows the leaves to stay on the hay.

From the foregoing, it will be readily appreciated by persons skilled in the art that I have provided an exceedingly practical and simple hay stacking and curing device, particularly desirable for use in the sun curing of hay, which if left upon the ground to cure, will lose a great portion of its strength and other valuable products, while the color will be bleached and the leaves permitted to fall off. Even though the hay be stacked about the improved device during inclement weather, it is to be noted that the same will be effectually ventilated and, consequently, caused to quickly dry and cure.

I also desire to have it understood that with my improved stacking and curing device, I am enabled to more easily and rapidly handle the hay, subsequent to the curing thereof, it being only necessary to move a sled or other conveyance to one side of the stack so formed, whereupon the top of the upright or pole is moved to cause the overturning of the stack onto the sled. By reason of the compact form of the stack, the same will remain intact about the pole until it is moved to the baler or usual garret whereupon the stack is then rolled off and the pole removed. In this way, I am enabled to dispense with considerable labor and further effect a considerable saving in time heretofore required during the handling of hay by the previously recognized methods. Furthermore, by varying the sizes of the pole and the tubular braces, it will be understood that a stack differing in size may be formed with the device.

As above indicated, I do not wish to be understood as confining the invention to the particular embodiment chosen for illustration herein, nor to the exact construction, arrangement, and adaption of parts, as shown and described, but I reserve the right to make any changes and alterations that clearly fall within the spirit and scope of the invention.

I claim:

1. A device of the character described including a tubular perforated pole, the lower end of which is designed to be embedded in the ground, a plurality of tubular braces having their upper ends designed for detachable engagement with the pole at points substantially medially of the ends of the pole, a plurality of upwardly inclined tongues struck out from the upper surfaces of the braces, and the lower ends of the braces being flattened and bent to provide anchoring feet for engaging the ground subsequent to the engagement of the upper ends of the braces with the pole.

2. A device of the character described including a tubular perforated pole having the lower end pointed and the upper end closed and also provided approximately medially of its ends with a circle of openings, a plurality of tubular braces having their lower ends designed for anchoring engagement with the ground, a plurality of tongues struck out from the upper surfaces of the braces, an angularly disposed tongue on the upper edge of each brace designed for engagement with the lower edge of the adjacent opening in the pole, and bearing ears formed opposite the tongue on the upper edges of the braces and designed for abutting relation with the outer surface of the pole in proximity to the adjacent opening.

3. A device of the character described including a tubular perforated pole having the lower end designed to be anchored in the ground and provided medially of its ends with a circle of openings, a plurality of tubular braces having their upper edges split and the adjacent portions bent to form opposed ears, an angularly disposed tongue on the upper edge of the brace positioned opposite to the ears and designed to be engaged over the lower edge of the adjacent opening in the pole, the ears being arranged in abutting relation with the outer surface of the pole, a plurality of upwardly inclined tongues struck out from the upper surface of each brace, and the lower ends of the braces being flatted and bent to provide anchoring feet for engagement with the ground subsequent to the engagement of the upper ends of the braces with the pole.

In testimony whereof I affix my signature hereto.

WILKINS H. MAYBERRY.

Copies of this patent may be obtained for five cents each, by addressing the "Commissioner of Patents, Washington, D. C."